United States Patent
Charrier et al.

(10) Patent No.: US 7,241,152 B2
(45) Date of Patent: Jul. 10, 2007

(54) SYSTEM FOR ELECTRICALLY CONNECTING AND FASTENING AT LEAST ONE PLATE-TYPE ELECTRICAL CONDUCTOR TO A SUPPORT PIECE

(75) Inventors: François Charrier, Arcon (FR); Hervé Krattinger, Pontarlier (FR)

(73) Assignee: Idealec, Pontarlier (FR)

( * ) Notice: Subject to any disclaimer, the term of this patent is extended or adjusted under 35 U.S.C. 154(b) by 0 days.

(21) Appl. No.: 10/548,682

(22) PCT Filed: Mar. 1, 2004

(86) PCT No.: PCT/FR2004/000475

§ 371 (c)(1),
(2), (4) Date: Jul. 10, 2006

(87) PCT Pub. No.: WO2004/084351

PCT Pub. Date: Sep. 30, 2004

(65) Prior Publication Data
US 2007/0093144 A1 Apr. 26, 2007

(30) Foreign Application Priority Data
Mar. 13, 2003 (FR) .................................. 03 03130

(51) Int. Cl.
*H01R 4/66* (2006.01)
(52) U.S. Cl. ..................... 439/97; 439/551; 439/801; 411/533; 411/166

(58) Field of Classification Search ................. 439/97, 439/573, 551, 801; 411/968, 970, 533, 182, 411/166, 173
See application file for complete search history.

(56) References Cited

U.S. PATENT DOCUMENTS

| | | | | |
|---|---|---|---|---|
| 3,418,869 A | * | 12/1968 | Herpich ...................... 411/968 |
| 4,676,706 A | * | 6/1987 | Inaba .......................... 411/970 |
| 4,802,863 A | | 2/1989 | Debus ........................ 439/387 |
| 5,205,760 A | * | 4/1993 | Agut Sanz .................. 439/551 |
| 6,692,314 B1 | * | 2/2004 | Pares Caselles ............ 439/801 |

FOREIGN PATENT DOCUMENTS

| | | |
|---|---|---|
| DE | 25 43 021 A | 3/1977 |
| EP | 0 899 816 A2 | 3/1999 |
| FR | 2 775 032 | 8/1999 |

* cited by examiner

*Primary Examiner*—Tho D. Ta
(74) *Attorney, Agent, or Firm*—Harrington & Smith, PC

(57) ABSTRACT

This system for electrically connecting and fastening at least one plate-type electrical conductor to a support piece provided with a nut designed to cooperate with a fastening screw of the conductor is characterized in that an annular spacer of electrically conductive material is joined to support piece on the side of this piece that is facing the conductor and in that nut is disposed on the other side of the support piece opposite this spacer and is connected to this spacer by floating coupling means designed to extend through a corresponding hole in this support piece and to prevent at least the nut from rotating on this piece.

8 Claims, 1 Drawing Sheet

SYSTEM FOR ELECTRICALLY CONNECTING AND FASTENING AT LEAST ONE PLATE-TYPE ELECTRICAL CONDUCTOR TO A SUPPORT PIECE

FIELD OF THE INVENTION

The present invention concerns a system for electrically coupling and fastening at least one plate-type electrical conductor to a support piece.

BACKGROUND OF THE INVENTION

More particularly, the invention relates to such systems in which the support piece is provided with a nut designed to cooperate with a fastening screw of the conductor.

Such connection systems are currently used, for example, in systems of plates or busbars to assure the connection of electrical conductors.

One example of such a system is described in document FR-A-2,784,241.

It is also known in a general way that these connecting systems have a certain number of disadvantages, notably during positioning and clamping of the conductor against the support piece, in places that are difficult to access.

In fact, these coupling systems are generally placed in the bottom of electrical supply cabinets or baskets and are difficult to access during mounting operations.

It can therefore happen that the operator lets go of one or the other of the pieces that make up these systems and that this piece is difficult or even impossible to recover.

Thus, one can see that this is annoying or even dangerous, particularly for the electrical integrity of the remainder of the cabinet and basket.

SUMMARY OF THE INVENTION

The object of the invention is therefore to resolve these problems.

For this purpose, the subject of the invention is a system for electrically connecting and fastening at least one plate-type electrical conductor to a support piece provided with a nut designed to cooperate with a fastening screw of the conductor, characterized in that an annular spacer of electrically conductive material is joined to the support piece on the side of this piece facing the conductor and in that the nut is disposed on the other side of the support piece opposite this spacer and is connected to this spacer by floating coupling means designed to extend through a corresponding hole in this support piece and to prevent at least the nut from rotating on this piece.

According to other characteristics:

the hole in the support piece has a generally oblong shape in order to facilitate the engagement of the screw in the nut;

the means for coupling the nut to the spacer also has a generally oblong shape and is designed to cooperate with the edges of the oblong hole of the support piece in order to prevent the nut from rotating relative to the support piece;

the means for coupling the nut to the spacer are present in the form of catch pieces designed to extend into the hole in the support piece and whose free end is provided with stop means designed to cooperate with complementary stop means of the spacer;

the stop means for the nut comprises at least one projecting part and the complementary stop means of the spacer comprises at least one corresponding rim;

the support piece is formed by another conductor;

the support piece is formed by an electrical component; and the support piece is formed by a plate for electrical connection.

BRIEF DESCRIPTION OF THE DRAWINGS

The invention will be better understood upon reading the description that follows, given solely by way of example and made by referring to the attached drawings in which.

DETAILED DESCRIPTION OF THE INVENTION

Figure 1:
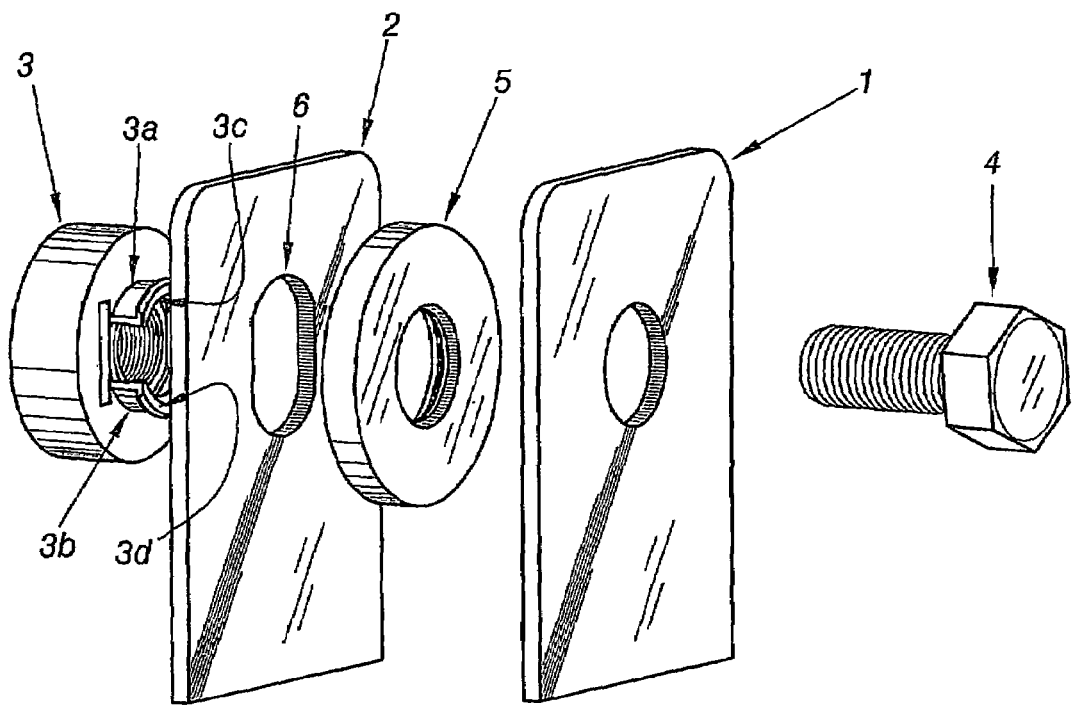
FIG. 1 shows an exploded perspective view of a connection system according to the invention.
Figure 2:
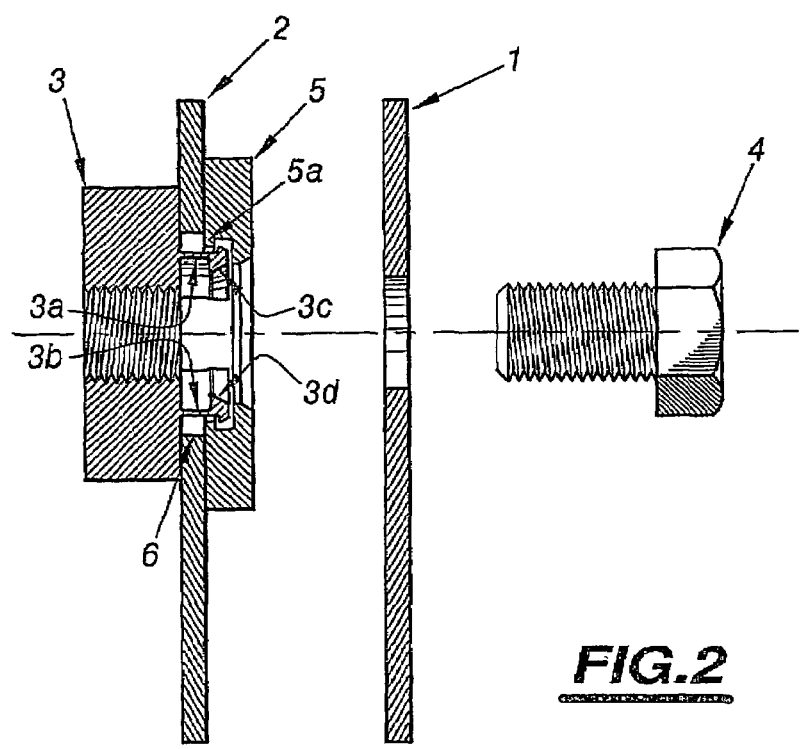
FIG. 2 shows a sectional view of the connection system.

In fact, these figures illustrate a system for electrically connecting and fastening at least one plate-type electrical conductor, designated by general reference 1 in these figures, to a support piece designated by general reference 2.

Different embodiments of this support piece can be envisioned: the support piece can be formed by another conductor, by an electrical component or by a plate or bar for electrical connection, etc.

In any case, this support piece is provided with a nut designated by general reference 3 in these figures, which is designed to cooperate with a screw for fastening the conductor to the piece and which is designated by general reference 4.

In the connection system according to the invention, an annular spacer of electrically conductive material designated by general reference 5 in these figures is joined to support piece 2 on the side of this support piece facing conductor 1 and nut 3 is disposed on the other side of the support piece opposite this spacer 5. Nut 3 is connected to spacer 5 by floating coupling means designed to extend through a corresponding hole in this support piece and to prevent at least the nut from rotating on this piece.

In the example of embodiment shown, the hole in the support piece is designated by general reference 6 and has a generally oblong shape to facilitate the engagement of the screw in the nut.

The means for coupling the nut to the spacer can also be made in different ways.

However, it is noted that these coupling means can also have a generally oblong shape and can be designed to cooperate with the edges of oblong hole 6 of the support piece, so as to prevent the nut from rotating relative to this piece.

In the example of embodiment shown, the means for coupling nut 3 to spacer 5 have the form of catch pieces, designated by general references 3a and 3b, for example, which are then designed to extend into hole 6 of support piece 2, and the free ends of these pieces are provided with stop means designed to cooperate with complementary stop means of the spacer.

These stop means of the nut comprise, for example, projecting parts 3c and 3d respectively, at the end of each catch piece 3a and 3b of the nut, while the complementary stop means of spacer 5 comprise at least one corresponding rim, for example 5a.

Thus, one can see that by means of this structure, the edges of the catch pieces of the nut come to rest against the edges of the oblong hole in the support piece to prevent it from rotating relative to the support piece and that, moreover, the nut and the spacer are coupled to one another and to the support piece, in a floating manner in oblong hole 6 of the support piece, which permits facilitating the engagement of screw 4 in the nut.

Such a structure permits, in particular, compensating for a possible alignment flaw of the conductor and the support piece.

Of course, other embodiments can also be envisioned.

The invention claimed is:

1. A system for electrically coupling and fastening at least one plate-type electrical conductor to a support piece provided with a nut designed to cooperate with a fastening screw of the at least one plate-type electrical conductor, characterized in that an annular spacer of electrically conductive material is joined to the support piece on the side of the latter facing the at least one plate-type electrical conductor and in that the nut is disposed on the other side of the support piece opposite the annular spacer and is connected to the annular spacer by floating coupling means designed to extend through a corresponding hole of the support piece and to prevent at least the nut from rotating on the support piece.

2. The system according to claim 1, further characterized in that the support piece is formed by another conductor.

3. The system according to claim 1, further characterized in that the support piece is formed by an electrical component.

4. The system according to claim 1, further characterized in that the support piece is formed by an electrical connection plate.

5. The system according to claim 1, further characterized in that the hole of the support piece has a generally oblong shape in order to facilitate the engagement of the fastening screw into the nut.

6. The system according to claim 5, further characterized in that the means for coupling the nut to the annular spacer also has a generally oblong shape and is designed to cooperate with the edges of the oblong hole of the support piece in order to prevent the nut from rotating relative to the support piece.

7. The system according to claim 6, further characterized in that the means for coupling the nut to the annular spacer are in the form of catch pieces designed to extend into the hole of the support piece and of which the free ends are provided with stop means designed to cooperate with complementary stop means of the annular spacer.

8. The system according to claim 7, further characterized in that the stop means of the nut comprise at least one projecting part and in that the complementary stop means of the annular spacer comprise at least one corresponding rim.

* * * * *